US012612983B2

(12) United States Patent　　(10) Patent No.:　US 12,612,983 B2
Aldinio-Colbachini　　　　　　　　(45) Date of Patent:　　Apr. 28, 2026

(54) FLEXIBLE TUBE FOR CONVEYING ABRASIVE MATERIALS AND RELATED MANUFACTURING METHOD

(71) Applicant: IVG COLBACHINI S.P.A., Cervarese Santa Croce (IT)

(72) Inventor: Giuseppe Aldinio-Colbachini, Cervarese Santa Croce (IT)

(73) Assignee: IVG COLBACHINI S.P.A., Cervarese Santa Croce (IT)

( * ) Notice: Subject to any disclaimer, the term of this patent is extended or adjusted under 35 U.S.C. 154(b) by 101 days.

(21) Appl. No.: 18/433,716

(22) Filed: Feb. 6, 2024

(65) Prior Publication Data

US 2024/0271740 A1　　Aug. 15, 2024

(30) Foreign Application Priority Data

Feb. 14, 2023　　(IT) ........................ 102023000002472

(51) Int. Cl.
　*F16L 11/08*　　　　(2006.01)
　*F16L 11/112*　　　(2006.01)
　*F16L 57/06*　　　(2006.01)
(52) U.S. Cl.
　CPC ............. *F16L 11/08* (2013.01); *F16L 11/112* (2013.01); *F16L 57/06* (2013.01)
(58) Field of Classification Search
　CPC .......... F16L 11/08; F16L 11/10; F16L 11/112; F16L 11/115; F16L 57/04
　See application file for complete search history.

(56) References Cited

U.S. PATENT DOCUMENTS

2016/0281900 A1　　9/2016　Moon et al.

FOREIGN PATENT DOCUMENTS

| CA | 2886739 | A1 | 9/2016 | |
| JP | S6292391 | U | 6/1987 | |
| WO | 2008/119395 | A1 | 10/2008 | |
| WO | 2010150621 | A1 | 12/2010 | |
| WO | WO-2013182884 | A1 * | 12/2013 | .............. F16L 57/06 |
| WO | WO-2022005628 | A1 * | 1/2022 | .............. F16L 11/08 |

* cited by examiner

*Primary Examiner* — Zachary T Dragicevich
(74) *Attorney, Agent, or Firm* — CANTOR COLBURN LLP

(57)　　　　　　　ABSTRACT

A flexible tube for conveying abrasive materials which has a tubular body extending along a main extension axis is provided. The tubular body has a thickness extending from an inner side wall, which delimits an inner cavity used for transporting abrasive material, to an outer side wall, opposite to the inner side wall along a radial direction, perpendicular and incident to the main extension axis. The tubular body has a covering layer at the outer side wall and an elastomeric matrix at least partially embedding circular disks having a diameter and flat faces, made of ceramic material, namely a first flat face directly facing the inner cavity so as to at least partially form the inner side wall and a second flat face embedded in the elastomeric matrix.

19 Claims, 6 Drawing Sheets

FLEXIBLE TUBE FOR CONVEYING ABRASIVE MATERIALS AND RELATED MANUFACTURING METHOD

CROSS-REFERENCE TO RELATED APPLICATION

This application claims priority to Italian Patent Application No. 102023000002472 filed Feb. 14, 2023, the entire contents of which is hereby incorporated in its entirety by reference.

FIELD OF THE INVENTION

The present invention relates to a flexible tube for conveying abrasive materials and the related manufacturing method.

BACKGROUND ART

In the industry field, the need to move abrasive materials, such as coal, glass powder, metals and waste of various forces and sizes, is known.

In the prior art, said abrasive materials are moved by means of plastic or elastomeric tubes which are fluidly connected to suction or delivery systems.

The inner walls of said plastic or elastomeric tubes are inevitably subject to early wear, due to the fact that the bodies moved therein tend to significantly abrade the inner walls of the tubes through which they are conveyed. For this reason, the tubes undergo very rapid deterioration which makes frequent replacement necessary, in the worst scenario, even once a week. As a result, the maintenance and downtime costs of the system significantly increase.

Several solutions aimed at solving the aforesaid technical problems exist in the art.

For example, it is known to provide plastic or rubber tubes equipped, at the inner side walls thereof, with protective elements such as spheres made of a highly hard material, as in case of ceramic materials, which are at least partially embedded in the main rubber structure forming the thickness of the conveying tube. It is apparent that embedding spheres inside the polymer matrix of the tube creates a solid, long-lasting fastening of the spheres with respect to the inner side walls of the tube itself.

However, such a solution is not free of some technical drawbacks. In particular, the spherical bodies have ends that interfere with and limit the passage lumen of the hollow tube: on the one hand, such ends reduce the effective flow rate of the tube, and on the other hand, they tend to be damaged and removed over time because of the continuous and violent impacts to which they are subjected by the bodies passing inside the tube. Therefore, even if such solutions require longer maintenance intervals as compared to the mentioned solutions of the prior art, they still imply non-negligible maintenance costs. By virtue of such spheres made of ceramic material it is possible to increase the maintenance intervals up to two or at the most three weeks.

Such maintenance intervals, although improved compared to some solutions of the prior art, are however not considered acceptable, as they result in significant increases in cost.

Moreover, it has been noted that such ceramic spheres significantly limit the curvature which can be given to the conveying tube, in particular at the intrados of the tube, since said curvature is limited indeed when adjacent spheres come into mutual contact at the already curved parts of the tube (typically at the intrados).

The curvature limits can be unacceptable drawbacks in some specific applications in which the available spaces impose particularly small radii of curvature, which are not practicable due to the reasons set out above.

SUMMARY OF THE INVENTION

Therefore, the need is felt to overcome the drawbacks and limitations mentioned with reference to the prior art.

Such a need is met by a tube for conveying abrasive materials and a method for making a flexible tube as described and claimed herein.

DESCRIPTION OF THE DRAWINGS

Further features and advantages of the present invention will be more comprehensible from the description given below of preferred, non-limiting embodiments thereof, in which.

The elements or parts of elements common to the embodiments described below will be indicated by the same reference numerals.

DETAILED DESCRIPTION

Figure 1:
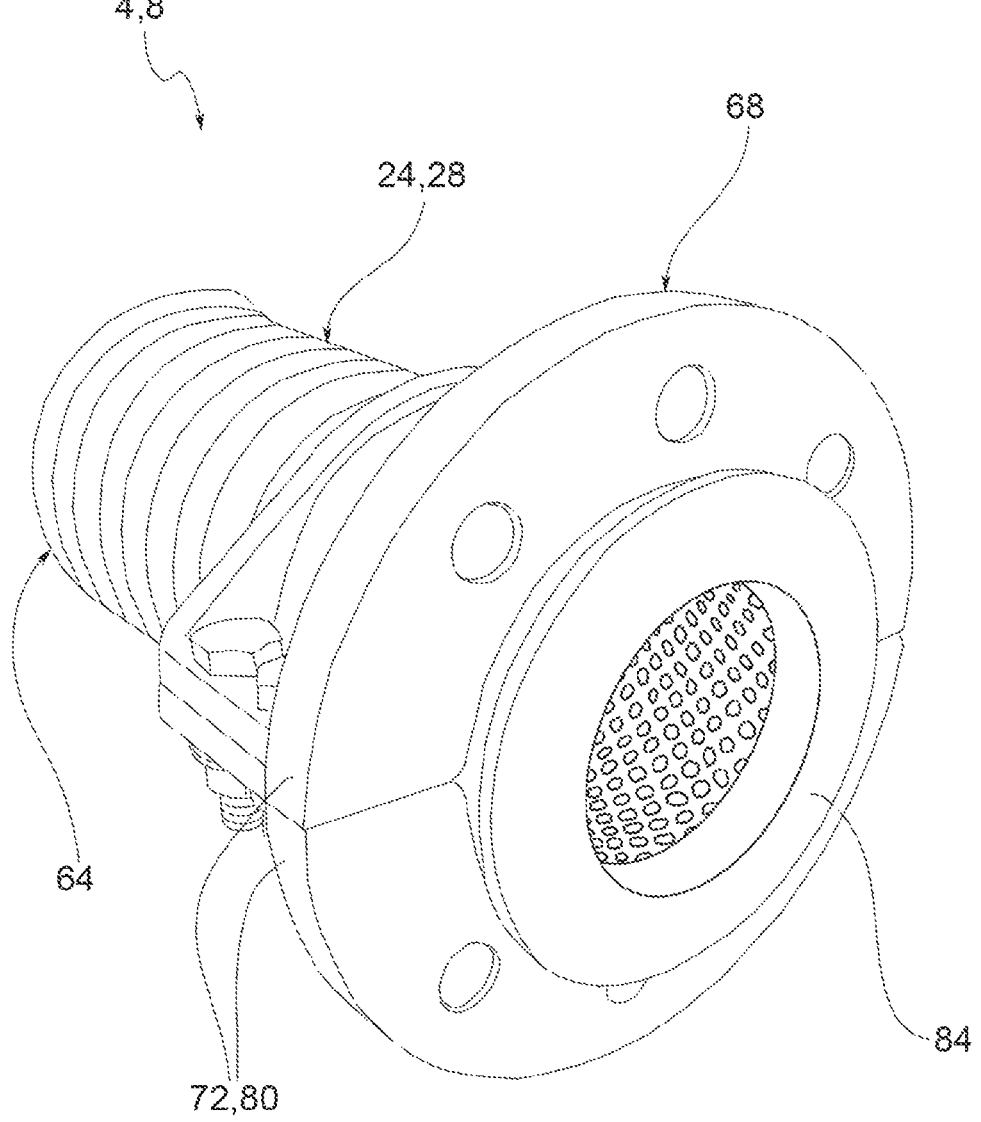
FIG. 1 is a perspective view, in an assembled configuration, of a flexible tube according to an embodiment of the present invention.
Figure 2:
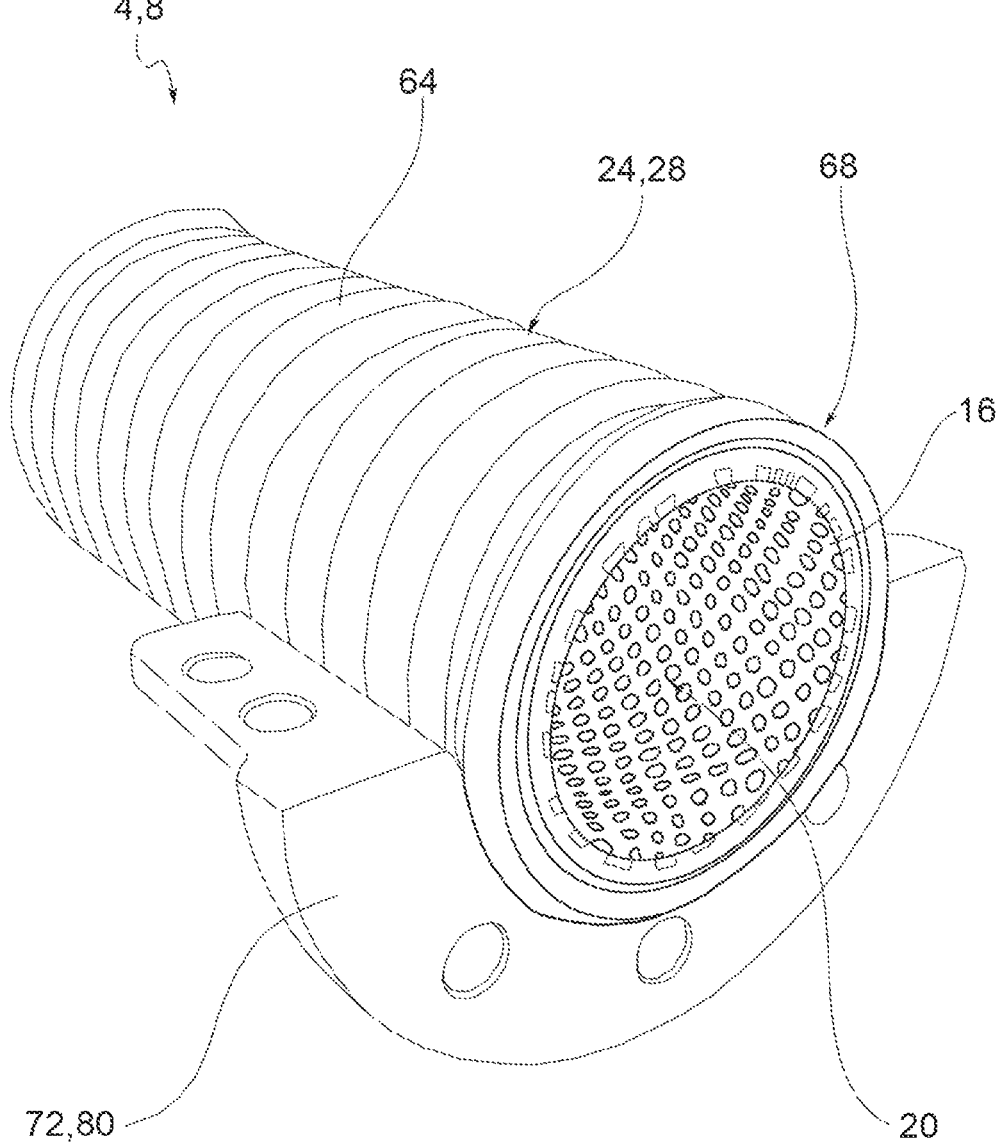
FIG. 2 is a perspective view of the flexible tube in FIG. 1, in which a half-shell of the flange has been removed.
Figure 3:
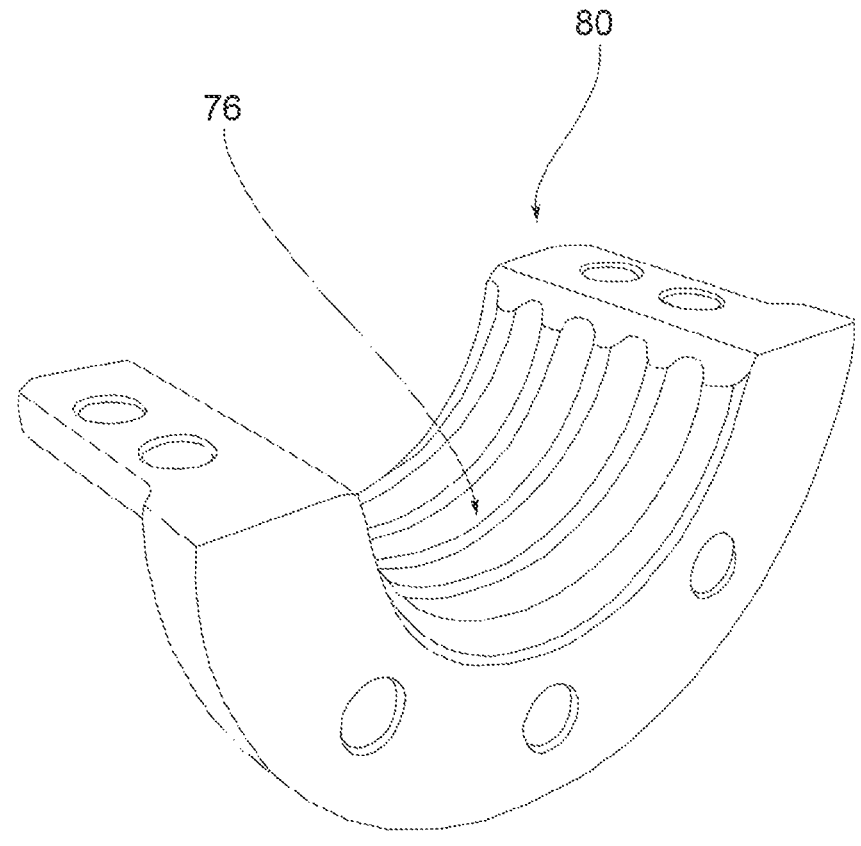
FIG. 3 is a perspective view of the half-shell removed from the configuration in FIG. 2.
Figure 4:
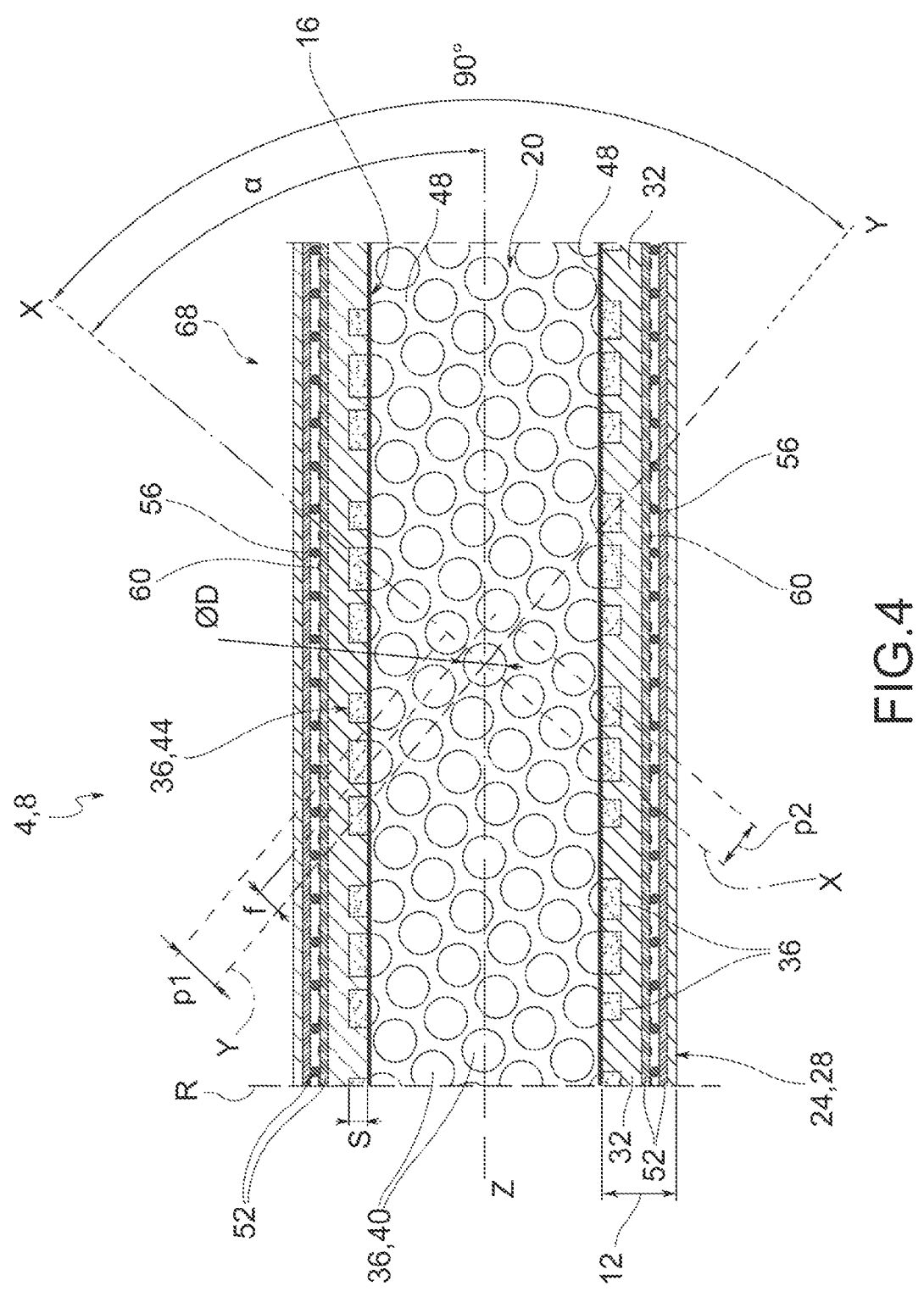
FIGS. 4-5 are sectional views of a flexible tube according to possible constructional variants of the present invention.
Figure 5:
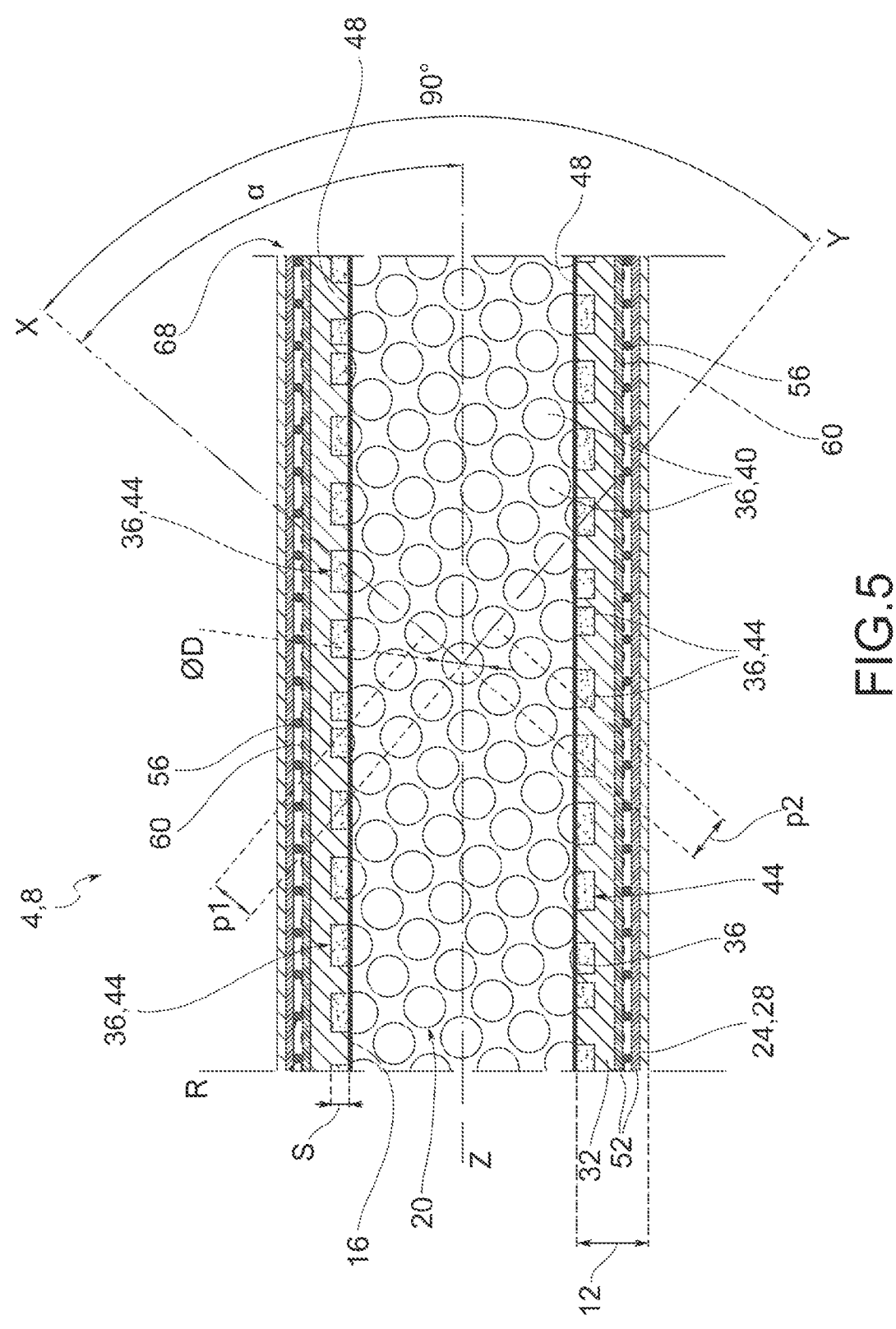

With reference to the aforesaid figures, reference numeral 4 indicates an overall view of a flexible tube for conveying abrasive materials.

A 'flexible' tube means a tube that can be easily laid and reversibly bent along a predetermined path without the aid of any bending tools: flexibility does not necessarily imply compressibility, i.e., modification of the geometry of the inner passage lumen of the tube, which remains substantially unvaried, typically with a circular section, throughout the laying and operating conditions of the flexible conveying tube.

Abrasive materials mean any type of material that is substantially hard and/or cutting and/or sharp, such as production waste, scraps.

The flexible tube 4 comprises a tubular body 8 extending along a main extension axis Z-Z.

Obviously, since the tube 4 is flexible, the main extension axis can be rectilinear but also curvilinear according to the final configuration of the tube: in this latter case, the main extension axis Z-Z will be assimilated to the segment tangential to the corresponding curvilinear abscissa. Below and in the figures in general, reference will be made to rectilinear segments of tube, without losing in generality.

The tubular body 8 has a thickness 12 extending from an inner side wall 16, which delimits an inner cavity 20 used for transporting abrasive material, to an outer side wall 24, opposite to said inner side wall 16 along a radial direction R-R, perpendicular and incident to said main extension axis Z-Z.

The tubular body 8 comprises a covering layer 28 made of synthetic rubber at the outer side wall 24. For example, said covering layer 28 made of synthetic rubber is made of an NR/BR mixture and/or SBR, EPDM, CR mixtures.

Advantageously, said tubular body 8 comprises an elastomeric matrix 32, in which there are at least partially embedded circular disks 36 having a diameter D and flat faces, made of ceramic material.

Said circular disks 36 act as a partial anti-abrasive coating of the inner side wall 16. In other words, the circular disks 36 increase the resistance of the inner side wall 16 when an abrasive material passes inside the cavity 20.

Said circular disks 36 have a first flat face 40 directly facing said inner cavity 20 so as to at least partially form the inner side wall 16 and a second flat face 44 embedded in the elastomeric matrix 32.

According to a possible embodiment, with respect to a diametric projection plane passing through the main extension axis Z-Z, the circular disks 36 are arranged on rows parallel to a first laying direction X-X with a first constant pitch p1, and on rows parallel to a second laying direction Y-Y, with a second constant pitch p2, said laying directions X-X, Y-Y being perpendicular to each other.

According to a possible embodiment, the first pitch p1 and the diameter D of the circular disks 36 are linked by the following relationship: $1 \leq p1/D \leq 1.5$.

According to a possible embodiment, the second pitch p2 and the diameter D of the circular disks 36 are linked by the following relationship: $1 \leq p2/D \leq 1.5$.

According to a possible embodiment, the circular disks 36 are arranged so that $30° \leq \alpha \leq 60°$, $\alpha$ being the angle identified between the first laying direction X-X and said main extension axis Z-Z of the tube 4.

According to a possible embodiment, the circular disks 36 are arranged so that $0 \leq f \leq p1/2$, f being equal to the distance, measured parallel to said first laying direction X-X, between the centres of two disks 36 arranged on rows adjacent to each other and parallel to the second laying direction Y-Y.

The circular disks 36 can have several dimensions: preferably the circular disks 36 have a diameter D between 3 mm and 20 mm.

Preferably, said circular disks 36 have a thickness S between 1 mm and 10 mm, the thickness S being equal to the distance between the first flat face 40 and the second flat face 44.

Preferably, the circular disks 36 are made of at least 92% sintered alumina ($Al_2O_3$): preferably said circular disks 36 have a Rockwell hardness (HRA) equal to at least 80.

According to a possible embodiment, said circular disks 36 are treated in advance with a solution cycle in order to improve the adhesion with said elastomeric matrix 32.

Said elastomeric matrix 32 comprises a portion of anti-abrasive rubber 48 directly facing the inner cavity 20. The inner side wall 16 is thus delimited by the first flat faces 40 of the circular disks 36 and by the portion of anti-abrasive rubber 48 filling the gaps between the first flat faces 40 of the circular disks 36 adjacent to one another.

Said elastomeric matrix 32 can comprise an NR/BR SBR and/or EPDM mixture.

According to a possible embodiment, at least one reinforcement layer 52 is embedded inside the elastomeric matrix 32, comprising synthetic fabrics embedded in SBR, NR/BR and/or EPDM mixture.

For example, said synthetic fabrics comprise cellulose and/or polyester and/or aramid and/or polyvinyl alcohol and/or polyamide, with titres between 940 dtex and 17600 dtex.

According to a possible embodiment, said reinforcement layer 52 comprises a steel spiral 56 of a diameter between 1 mm and 14 mm.

According to a possible embodiment, at least one copper braid 60 is embedded inside the elastomeric matrix 32, for the dissipation of the electrostatic charges: for example, the copper braid consists of 60-120 tinned copper wires of diameter 0.1.

According to a possible embodiment, at said outer side wall 24, the flexible tube 4 has a corrugated outer profile 64 and, at at least one axial end 68 of the flexible tube 4, at least one flange 72 having a corrugated inner profile 76 corresponding to said outer profile of the flexible tube is applied, so as to obtain a shape coupling with the latter.

For example, said flange 72 comprises a pair of mirrored half-shells 80 clamped to each other on the outer side wall 24 of the flexible tube 4 and at least one lip seal 84 at said axial end of the tube 4.

Preferably, said lip seal 84 is at least partially interposed between the half-shells 80 and the outer side wall 24 of the tube 4.

The method for making and mounting a flexible tube according to the present invention will now be described.

Figure 6:
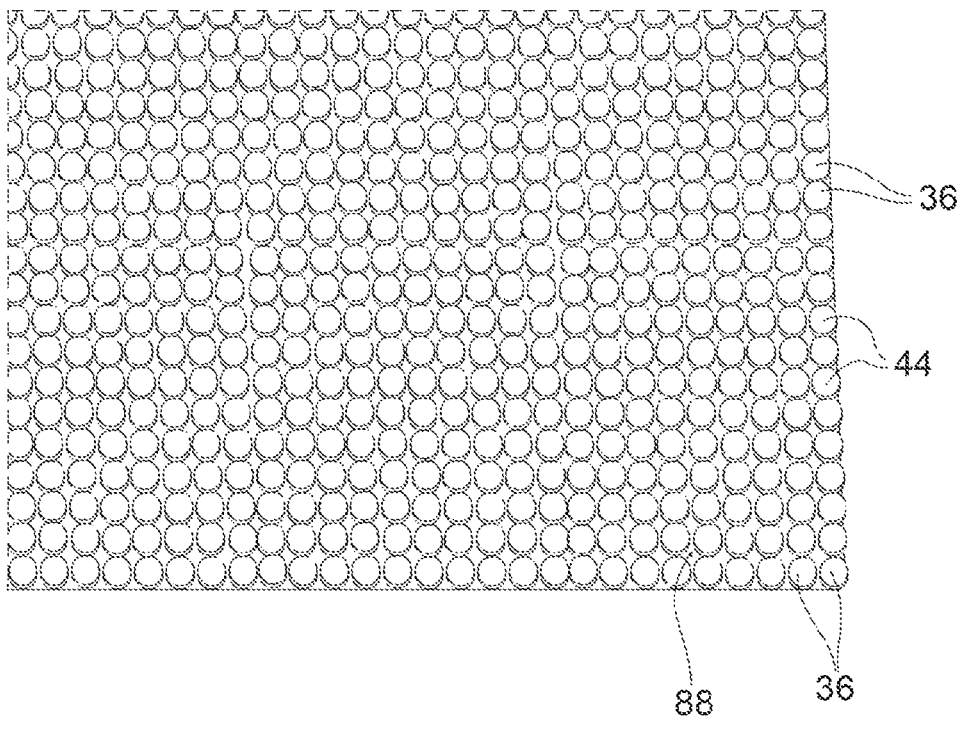
FIGS. 6-7 depict the inserts made of ceramic material supported by a film made of plastic material used in the subsequent steps of producing a flexible tube according to a possible embodiment of the present invention.

In particular, the method for making a flexible tube 4 according to the invention comprises the steps of arranging and constraining, on a plastic film 88, a plurality of circular disks 36 according to the pattern described above (FIG. 6). It is to be specified that, following the use of the tube, with the passage of the abrasive material, such a plastic film 88 is removed: therefore, the purpose of said plastic film 88 consists in allowing/facilitating the correct arrangement of the circular disks 36 in the inner side wall 16 of the flexible tube 4.

Figure 7:
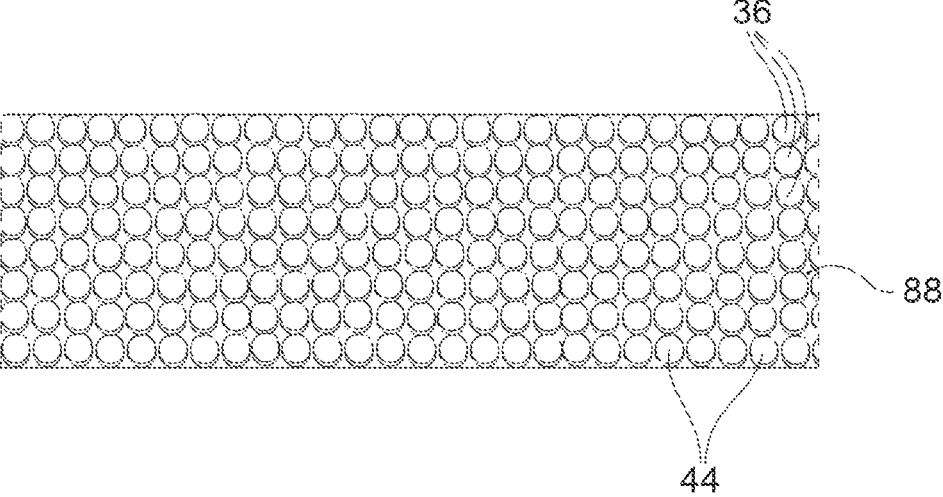

Therefore, a solution step is carried out on the second flat faces 44 of the circular disks 36 intended to be embedded in an elastomeric matrix 32 (FIG. 7).

This is followed by the step of rolling said plastic film 88 (carrying the aforesaid circular disks 36) onto a cylindrical core intended to positively reproduce the inner cavity delimited by the flexible tube 4.

A first layer of elastomeric matrix 32 is spread onto the previously rolled plastic film 88, so as to embed the circular disks 36 on the side of the second flat faces 44 of the circular disks themselves.

Then, at least a second layer of elastomeric matrix 32 is spread, so as to completely incorporate the circular disks 36 and reinforce the overall structure of the tube 4.

Moreover, possible reinforcement layers 52 are applied, comprising synthetic fabrics made of SBR, NR/BR and/or EPDM mixture, and/or a steel spiral 56 and/or a copper braid 60 for the dissipation of the electrostatic charges.

Finally, a covering layer 28 of NR/BR or SBR or EPDM or CR mixture is applied.

As can be appreciated from the description above, the present invention allows overcoming the drawbacks of the prior art.

In particular, the flexible conveying tube according to the present invention is capable of transporting abrasive materials moved by suction or delivery without undergoing deterioration due to abrasion.

The solution according to the present invention has significantly longer maintenance intervals compared to the above mentioned solutions of the prior art.

Moreover, the present invention allows transporting products that require the absolute absence of electric charges, due to the provision of copper braids that can dissipate said electrostatic charges.

In addition, the solution according to the present invention allows making great tube curvatures, because the ceramic disks do not protrude into the passage lumen of the tube itself. Moreover, the particular geometry and arrangement of such reinforcement disks ensures excellent flexibility for the tube itself.

In order to meet specific contingent needs, those skilled in the art may make several changes and variations to the solutions described above.

The scope of protection of the invention is defined by the following claims.

What is claimed is:

1. A flexible tube for conveying abrasive materials comprising a tubular body extending along a main extension axis, the tubular body having a thickness extending from an inner side wall, which delimits an inner cavity used for transporting an abrasive material, to an outer side wall, opposite said inner side wall along a radial direction, perpendicular and incident with said main extension axis, wherein said tubular body comprises a covering layer at the outer side wall, and wherein said tubular body comprises an elastomeric matrix, inside which are at least partially embedded circular disks having a diameter (D) and flat faces, in ceramic material, namely a first flat face directly facing said inner cavity, so as to at least partially constitute the inner side wall and a second flat face embedded in the elastomeric matrix, wherein, with respect to a diametric projection plane, passing through the main extension axis, the circular disks are arranged on rows parallel to a first laying direction with a first constant pitch (p1), and on rows parallel to a second laying direction, with a second constant pitch (p2), said first and second laying directions being perpendicular to each other.

2. The flexible tube of claim 1, wherein the first constant pitch and the diameter of the circular disks are linked by the following relationship: 1≤p1/D≤1.5.

3. The flexible tube of claim 1, wherein the second constant pitch and the diameter of the circular disks are linked by the following relationship 1≤p2/D≤1.5.

4. The flexible tube of claim 1, wherein 30°≤α≤60°, α being an angle identified between the first laying direction and said main extension axis of the flexible tube.

5. The flexible tube of claim 1, wherein 0≤f≤p1/2, f being equal to a distance, measured parallel to said first laying direction, between centres of two circular disks arranged on rows adjacent to each other and parallel to the second laying direction.

6. The flexible tube of claim 1, wherein the diameter of said circular disks is comprised between 3 mm and 20 mm.

7. The flexible tube of claim 1, wherein said circular disks have a thickness comprised between 1 mm and 10 mm.

8. The flexible tube of claim 1, wherein said elastomeric matrix comprises a portion of anti-abrasive rubber directly facing the inner cavity.

9. The flexible tube of claim 1, wherein said circular disks are made of at least 92% sintered alumina ($Al_2O_3$).

10. The flexible tube of claim 1, wherein said circular disks have a Rockwell hardness (HRA) equal to at least 80.

11. The flexible tube of claim 1, wherein said circular disks are treated in advance with a solution cycle so as to improve adhesion to the elastomeric matrix.

12. The flexible tube of claim 1, wherein said elastomeric matrix comprises a natural rubber/butadiene rubber (NR/BR), styrene-butadiene rubber (SBR) and/or ethylene-propylene-diene monomer (EPDM) mixture.

13. The flexible tube of claim 1, wherein at least one reinforcement layer is embedded inside the elastomeric matrix, comprising synthetic fabrics embedded in a natural rubber/butadiene rubber, styrene-butadiene rubber, and/or ethylene-propylene-diene monomer mixture.

14. The flexible tube of claim 13, wherein said reinforcement layer comprises a steel spiral having a diameter between 1 mm and 14 mm.

15. The flexible tube of claim 13, wherein said synthetic fabrics comprise cellulose and/or polyester and/or aramid and/or polyvinyl alcohol and/or polyamide, with titres between 940 dtex and 17600 dtex.

16. The flexible tube of claim 1, wherein at least one copper braid is embedded inside the elastomeric matrix, for dissipation of electrostatic charges.

17. The flexible tube of claim 1, wherein said covering layer is made of a natural rubber/butadiene rubber mixture and/or of styrene-butadiene rubber, ethylene-propylene-diene monomer rubber, chloroprene rubber (CR) mixtures.

18. A flexible tube for conveying abrasive materials comprising a tubular body extending along a main extension axis, the tubular body having a thickness extending from an inner side wall, which delimits an inner cavity used for transporting an abrasive material, to an outer side wall, opposite said inner side wall along a radial direction, perpendicular and incident with said main extension axis, wherein said tubular body comprises a covering layer at the outer side wall, and wherein said tubular body comprises an elastomeric matrix, inside which are at least partially embedded circular disks having a diameter (D) and flat faces, in ceramic material, namely a first flat face directly facing said inner cavity, so as to at least partially constitute the inner side wall and a second flat face embedded in the elastomeric matrix;

wherein, at said outer side wall, the flexible tube has a corrugated outer profile and, at least one axial end of the flexible tube, at least one flange having a corrugated inner profile corresponding to said corrugated outer profile of the flexible tube is applied, to obtain a shape coupling with the corrugated outer profile of the flexible tube.

19. The flexible tube of claim 18, wherein said flange comprises a pair of mirrored half-shells clamped to each other on the outer side wall of the flexible tube and at least one lip seal at said axial end of the flexible tube, said lip seal being at least partially interposed between the mirrored half-shells and the outer side wall of the flexible tube.

* * * * *